(12) United States Patent  (10) Patent No.: US 8,964,958 B2
Steiner  (45) Date of Patent: *Feb. 24, 2015

(54) GRID-BASED CONTACT CENTER

(75) Inventor: Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 1267 days.

This patent is subject to a terminal disclaimer.

(21) Appl. No.: 12/469,523

(22) Filed: May 20, 2009

(65) Prior Publication Data

US 2010/0296417 A1  Nov. 25, 2010

(51) Int. Cl.
| H04M 7/00 | (2006.01) |
| H04M 3/00 | (2006.01) |
| H04L 29/06 | (2006.01) |
| H04L 29/08 | (2006.01) |

(52) U.S. Cl.
CPC .............. *H04L 65/00* (2013.01); *H04L 65/403* (2013.01); *H04L 67/1002* (2013.01)
USPC ............. 379/221.01; 379/265.01; 379/265.09

(58) Field of Classification Search
USPC ............... 379/265.01–265.14, 266.01–266.1, 379/309, 221.01
See application file for complete search history.

(56) References Cited

U.S. PATENT DOCUMENTS

| 3,689,132 A | 9/1972 | Baker |
| 4,163,124 A | 7/1979 | Jolissaint |
| 4,567,323 A | 1/1986 | Lottes et al. |
| 4,737,983 A | 4/1988 | Frauenthal et al. |
| 4,797,911 A | 1/1989 | Szlam et al. |
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland |
| 5,155,761 A | 10/1992 | Hammond |
| 5,164,983 A | 11/1992 | Brown et al. |
| 5,174,700 A | 12/1992 | Sgarbi et al. |
| 5,178,898 A | 1/1993 | Juchem |
| 5,206,903 A | 4/1993 | Kohler et al. |
| 5,210,789 A | 5/1993 | Jeffus et al. |
| 5,274,700 A | 12/1993 | Gechter et al. |
| 5,278,898 A | 1/1994 | Cambray et al. |
| 5,291,550 A | 3/1994 | Levy et al. |
| 5,299,260 A | 3/1994 | Shaio |
| 5,309,513 A | 5/1994 | Rose |

(Continued)

FOREIGN PATENT DOCUMENTS

| CA | 2143198 | 1/1995 |
| CA | 2174762 | 3/1996 |

(Continued)

OTHER PUBLICATIONS

U.S. Appl. No. 10/815,534, filed Mar. 31, 2004, Kiefhaber.

(Continued)

*Primary Examiner* — William Deane, Jr.
(74) *Attorney, Agent, or Firm* — Sheridan Ross P.C.

(57) ABSTRACT

A grid-based contact center and method of managing tasks within such a contact center is provided. Nodes within the contact center are adapted to perform multiple tasks associated with the contact center, including the management of task assignment within the contact center. Accordingly, a truly distributed contact center is provided whereby the building blocks of the contact center include the use of nodes with a conference call SRTP based Operations, Administration, and Management system.

20 Claims, 5 Drawing Sheets

(56) References Cited

U.S. PATENT DOCUMENTS

| | | |
|---|---|---|
| 5,329,579 A | 7/1994 | Brunson |
| 5,335,268 A | 8/1994 | Kelly, Jr. et al. |
| 5,335,269 A | 8/1994 | Steinlicht |
| 5,390,243 A | 2/1995 | Casselman et al. |
| 5,436,965 A | 7/1995 | Grossman et al. |
| 5,444,774 A | 8/1995 | Friedes |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,592,378 A | 1/1997 | Cameron et al. |
| 5,592,542 A | 1/1997 | Honda et al. |
| 5,594,726 A | 1/1997 | Thompson et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,684,872 A | 11/1997 | Flockhart et al. |
| 5,684,874 A | 11/1997 | Yagyu et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,724,092 A | 3/1998 | Davidsohn et al. |
| 5,740,238 A | 4/1998 | Flockhart et al. |
| 5,742,675 A | 4/1998 | Kilander et al. |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,790,642 A * | 8/1998 | Taylor et al. ............ 379/114.02 |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,818,907 A | 10/1998 | Maloney et al. |
| 5,825,869 A | 10/1998 | Brooks et al. |
| 5,828,747 A | 10/1998 | Fisher et al. |
| 5,838,968 A | 11/1998 | Culbert |
| 5,839,117 A | 11/1998 | Cameron et al. |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,793 A | 5/1999 | Flockhart et al. |
| 5,915,012 A | 6/1999 | Miloslavsky |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandilt |
| 5,940,496 A | 8/1999 | Gisby et al. |
| 5,940,498 A | 8/1999 | Bardl |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,979,117 A | 11/1999 | Fuller |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,038,293 A | 3/2000 | Mcnerney et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,084,954 A | 7/2000 | Harless |
| 6,088,441 A | 7/2000 | Flockhart et al. |
| 6,115,462 A | 9/2000 | Servi et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,151 B1 * | 5/2001 | Agrawal et al. ................. 706/12 |
| 6,230,183 B1 | 5/2001 | Yocom et al. |
| 6,233,333 B1 | 5/2001 | Dezonmo |
| 6,240,417 B1 | 5/2001 | Eastwick |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley |
| 6,289,969 B1 | 9/2001 | Outten et al. |
| 6,292,550 B1 | 9/2001 | Burritt |
| 6,295,353 B1 | 9/2001 | Flockhart et al. |
| 6,353,810 B1 | 3/2002 | Pertrushin |
| 6,356,632 B1 | 3/2002 | Foster et al. |
| 6,366,668 B1 | 4/2002 | Borst et al. |
| 6,373,929 B1 * | 4/2002 | Johnson et al. .......... 379/114.02 |
| 6,389,028 B1 | 5/2002 | Bondarenko et al. |
| 6,389,132 B1 | 5/2002 | Price |
| 6,389,400 B1 | 5/2002 | Bushey et al. |
| 6,424,709 B1 | 7/2002 | Doyle et al. |
| 6,426,950 B1 | 7/2002 | Mistry |
| 6,427,137 B2 | 7/2002 | Pertrushin |
| 6,430,282 B1 | 8/2002 | Bannister et al. |
| 6,434,230 B1 | 8/2002 | Gabriel |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. |
| 6,463,148 B1 | 10/2002 | Brady |
| 6,463,346 B1 | 10/2002 | Flockhart et al. |
| 6,463,415 B2 | 10/2002 | St. John |
| 6,480,826 B2 | 11/2002 | Pertrushin |
| 6,490,350 B2 | 12/2002 | McDuff et al. |
| 6,535,600 B1 | 3/2003 | Fisher et al. |
| 6,535,601 B1 | 3/2003 | Flockhart et al. |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. |
| 6,597,685 B2 | 7/2003 | Miloslavsky et al. |
| 6,614,903 B1 | 9/2003 | Flockhart et al. |
| 6,650,748 B1 | 11/2003 | Edwards et al. |
| 6,697,457 B2 | 2/2004 | Petrushin |
| 6,704,409 B1 | 3/2004 | Dilip et al. |
| 6,707,903 B2 | 3/2004 | Burok et al. |

(56) References Cited

U.S. PATENT DOCUMENTS

| | | |
|---|---|---|
| 6,744,877 B1 | 6/2004 | Edwards |
| 6,754,333 B1 | 6/2004 | Flockhart et al. |
| 6,766,013 B2 | 7/2004 | Flockhart et al. |
| 6,766,014 B2 | 7/2004 | Flockhart et al. |
| 6,785,380 B2 | 8/2004 | Ribera |
| 6,876,734 B1* | 4/2005 | Summers et al. ......... 379/202.01 |
| 6,947,543 B2 | 9/2005 | Alvarado et al. |
| 7,035,808 B1* | 4/2006 | Ford .............................. 705/7.14 |
| 7,035,927 B2 | 4/2006 | Flockhart et al. |
| 7,188,992 B2* | 3/2007 | Mattingly, Jr. ................... 366/82 |
| 7,200,219 B1 | 4/2007 | Edwards et al. |
| 7,295,669 B1* | 11/2007 | Denton et al. ............ 379/265.02 |
| 7,346,574 B2* | 3/2008 | Smith et al. ...................... 705/37 |
| 7,411,939 B1* | 8/2008 | Lamb et al. .................... 370/352 |
| 7,417,989 B1* | 8/2008 | Doran ............................ 370/390 |
| 7,444,139 B1 | 10/2008 | Welch et al. |
| 7,461,130 B1* | 12/2008 | AbdelAziz et al. ............ 709/208 |
| 7,500,241 B1 | 3/2009 | Flockhart et al. |
| 7,574,736 B2 | 8/2009 | Salapaka et al. |
| 7,739,155 B2* | 6/2010 | Fellenstein et al. ........... 705/26.3 |
| 8,116,237 B2 | 2/2012 | Steiner et al. |
| 8,144,619 B2* | 3/2012 | Hoffberg ....................... 370/254 |
| 8,149,262 B2* | 4/2012 | Tucker et al. ............... 348/14.09 |
| 8,331,549 B2* | 12/2012 | Fama et al. .............. 379/265.06 |
| 8,346,591 B2* | 1/2013 | Fellenstein et al. ........... 705/7.26 |
| 2001/0012356 A1* | 8/2001 | McDuff et al. ........... 379/265.02 |
| 2002/0072618 A1 | 6/2002 | Afzali-Ardakani et al. |
| 2002/0138394 A1* | 9/2002 | Elliott ............................ 705/37 |
| 2002/0147777 A1* | 10/2002 | Hackbarth et al. ............ 709/205 |
| 2002/0178237 A1* | 11/2002 | Sakata ........................... 709/219 |
| 2002/0178273 A1 | 11/2002 | Pardo-Castellote et al. |
| 2002/0194002 A1 | 12/2002 | Pertrushin |
| 2003/0039216 A1* | 2/2003 | Sheldon et al. ............... 370/260 |
| 2003/0093465 A1 | 5/2003 | Banerjee et al. |
| 2003/0120789 A1 | 6/2003 | Hepworth et al. |
| 2003/0174830 A1 | 9/2003 | Boyer et al. |
| 2003/0177017 A1* | 9/2003 | Boyer et al. ...................... 705/1 |
| 2004/0003046 A1 | 1/2004 | Grabelsky et al. |
| 2004/0141508 A1* | 7/2004 | Schoeneberger et al. ..... 370/401 |
| 2004/0203586 A1* | 10/2004 | Cashiola ....................... 455/407 |
| 2004/0203878 A1 | 10/2004 | Thomson |
| 2004/0218553 A1* | 11/2004 | Friedrich et al. .............. 370/260 |
| 2005/0071211 A1 | 3/2005 | Flockhart et al. |
| 2005/0071212 A1 | 3/2005 | Flockhart et al. |
| 2005/0071241 A1 | 3/2005 | Flockhart et al. |
| 2005/0071844 A1 | 3/2005 | Flockhart et al. |
| 2006/0015388 A1 | 1/2006 | Flockhart et al. |
| 2006/0026231 A1* | 2/2006 | Degenhardt et al. .......... 709/204 |
| 2006/0067506 A1 | 3/2006 | Flockhart et al. |
| 2006/0098625 A1 | 5/2006 | King et al. |
| 2006/0112004 A1* | 5/2006 | Kim ................................ 705/37 |
| 2006/0173921 A1 | 8/2006 | Jalonen |
| 2006/0222155 A1* | 10/2006 | Summers et al. ......... 379/202.01 |
| 2006/0277096 A1* | 12/2006 | Levitus ........................... 705/14 |
| 2007/0072618 A1 | 3/2007 | Freytsis et al. |
| 2007/0223671 A1* | 9/2007 | Lee ........................ 379/201.01 |
| 2007/0263787 A1 | 11/2007 | Dong et al. |
| 2007/0299680 A1 | 12/2007 | Fama et al. |
| 2008/0065902 A1 | 3/2008 | Spohrer et al. |
| 2008/0084831 A1 | 4/2008 | Sylvain |
| 2008/0205390 A1* | 8/2008 | Bangalore et al. ............ 370/389 |
| 2009/0172025 A1* | 7/2009 | Ristock et al. ............. 707/104.1 |
| 2009/0238359 A1 | 9/2009 | Ely et al. |
| 2009/0279436 A1 | 11/2009 | Chin et al. |
| 2010/0080150 A1 | 4/2010 | Steiner et al. |
| 2010/0138270 A1* | 6/2010 | Werth et al. ....................... 705/9 |
| 2010/0162292 A1* | 6/2010 | Potrebic et al. ................. 725/27 |
| 2012/0036194 A1* | 2/2012 | Whynot et al. ............... 709/205 |

FOREIGN PATENT DOCUMENTS

| | | |
|---|---|---|
| DE | 102006031080 | 1/2008 |
| EP | 0501189 | 9/1992 |
| EP | 0740450 | 10/1996 |
| EP | 0772335 | 5/1997 |
| EP | 0829996 | 3/1998 |
| EP | 0855826 | 7/1998 |
| EP | 0863651 | 9/1998 |
| EP | 0866407 | 9/1998 |
| EP | 899673 | 3/1999 |
| EP | 998108 | 5/2000 |
| EP | 1091307 | 4/2001 |
| EP | 1150236 | 10/2001 |
| EP | 1643743 | 4/2006 |
| GB | 2273418 | 6/1994 |
| GB | 2290192 | 12/1995 |
| WO | WO 96/07141 | 3/1996 |
| WO | WO 97/28635 | 8/1997 |
| WO | WO 98/56207 | 12/1998 |

OTHER PUBLICATIONS

U.S. Appl. No. 10/815,566, filed Mar. 31, 2004, Kiefhaber.
U.S. Appl. No. 10/815,584, filed Mar. 31, 2004, Kiefhaber.
U.S. Appl. No. 10/861,193, filed Jun. 3, 2004, Kiefhaber.
U.S. Appl. No. 10/946,638, filed Sep. 20, 2004, Flockhart et al.
U.S. Appl. No. 11/619,504, filed Jan. 3, 2007, Davis et al.
U.S. Appl. No. 12/239,120, filed Sep. 26, 2008, Steiner et al.
U.S. Appl. No. 12/545,386, filed Aug. 21, 2009, Flockhart et al.
U.S. Appl. No. 12/564,831, filed Sep. 21, 2009, Flockhart et al.
"Applications, NPRI's Predictive Dialing Package," Computer Technology (Fall 1993), p. 86.
"Domain Name Services," available at http://www.psm.com/chapt09/chapt09.html, downloaded Mar. 31, 2003, 21 pages.
"eGain's Commerce 2000 Platform Sets New Standard for eCommerce Customer Communications," Business Wire (Nov. 15, 1999)., 3 pages.
"Internet Protocol Addressing," available at http://samspade.org/d/ipdns.html, downloaded Mar. 31, 2003, 9 pages.
"Product Features," Guide to Call Center Automation, CRC Information Systems, Inc., Tel-Athena, Sectional 5—Company C520, p. 95, 1992.
"The Advantages of Load Balancing in the Multi-Call Center Enterprise," Avaya Inc. White Paper (Feb. 2002), pp. 1-13.
"The Dynamic Data Center", The Burton Group, Jun. 11, 2008, pp. 1-30.
"VAST™, Voicelink Application Software for Teleservicing®," System Manager User's Guide, Digital Systems (1994), pp. ii, vii-ix, 1-2, 2-41 through 2-77.
"When Talk Isn't Cheap," Sm@rt Reseller, v. 3, n. 13 (Apr. 3, 2000), p. 50.
"Call Center Software You Can't Outgrow," Telemarketing® (Jul. 1993), p. 105.
Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.
Avaya, Inc. Business Advocate Options, at http://www.avaya.com, downloaded on Feb. 15, 2003, Avaya, Inc. 2003.
Avaya, Inc. Business Advocate Product Summary, at http://www.avaya.com, downloaded on Feb. 15, 2003, Avaya, Inc. 2003, 3 pages.
Avaya, Inc., "Better Implementation of IP in Large Networks," Avaya, Inc. 2002, 14 pages.
Avaya, Inc., "Voice Over IP Via Virtual Private Networks: An Overview," Avaya, Inc., Feb. 2001, 9 pages.
Bellsouth Corp., "Frequently Asked Questions—What is a registrar?," available at https://registration.belisouth.neU NASApp/DNSWebUI/FAQ.jsp, downloaded Mar. 31, 2003,4 pages.
CentreVu Advocate Release 9 User Guide, Avaya Inc., 585-215-953, Issue 1 (Dec. 2000), pp. 1-210.
Chavez, David, et al., "Avaya MultiVantage Software: Adapting Proven Call Processing for the Transition to Converged IP Networks," Avaya, Inc., Aug. 2002, pp. 1-20.
Coles, Scott, "A Guide for Ensuring Service Quality in IP Voice Networks," Avaya, Inc., 2002, pp. 1-17.
Dawson, "NPRI's Powerguide, Software Overview" Call Center Magazine (Jun. 1993), p. 85.

(56) References Cited

OTHER PUBLICATIONS

DEFINITY Communications System Generic 3 Call Vectoring/Expert Agent Selection (EAS) Guide, AT&T publication No. 555-230-520 (Issue 4, Sep. 1995).

Doo-Hyun Kim et al. "Collaborative Multimedia Middleware Architecture and Advanced Internet Call Center," Proceedings at the International Conference on Information Networking (Jan. 31, 2001), pp. 246-250.

Douglas W. Stevenson et al., "Name Resolution in network and Systems Management Environments," available at http://netman.cit.buffalo.edu/Doc/Dstevenson/NR-NMSE.html, downloaded Mar. 31, 2003, 16 pages.

E. Noth et al., "Research Issues for the Next Generation Spoken": University of Erlangen-Nuremberg, Bavarian Research Centre for Knowledge-Based Systems, at http://www5.informatik.unierlangen.de/literature/psdir/1999/Noeth99:RIF.ps.gz 16 pages.

Foster, Robin, et al., "Avaya Business Advocate and its Relationship to Multi-Site Load Balancing Applications," Avaya, Inc., Mar. 2002, 14 pages.

GEOTEL Communications Corporation Web site printout entitled "Intelligent CallRouter Optimizing the Interaction Between Customers and Answering Resources.", 1998, 6 pages.

Hill, "Contact Center on Demand: An opportunity for telcos to be leaders in the grid-computing revolution," Telephony Online, Jul. 2, 2003, pp. 1-5.

John H.L. Hansen and Levent M. Arsian, Foreign Accent Classification Using Source Generator Based Prosodic Features, IEEE Proc. ICASSP, vol. 1, pp. 1-4, Detroit USA (May 1995).

L.F. Lamel and J.L. Gauvain, Language Identification Using Phone-Based Acoustic Likelihood, ICASSP-94, 4 pages.

Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-32.

Levent M. Arsian, Foreign Accent Classification in American English, Department of Electrical Computer Engineering, Duke University, Thesis, pp. 1-218 (1996).

MIT Project Oxygen, Pervasis, Human-Centered Computing (MIT Laboratory for Computer Science) (Jun. 2000) pp. 1-15.

Presentation by Victor Zue, The MIT Ox90ygen Project, MIT Laboratory for Computer Science (Apr. 25-26, 2000) 9 pages.

Official Action for U.S. Appl. No. 12/563,831, mailed Jul. 19, 2012 6 pages.

Notice of Allowance for U.S. Appl. No. 12/563,831, mailed Oct. 16, 2012 7 pages.

* cited by examiner

GRID-BASED CONTACT CENTER

FIELD

The present invention is directed generally to distributed contact centers.

BACKGROUND

Contact centers are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are customer-specifiable (i.e., programmable by the operator of the contact center), via a capability called vectoring. Normally in present-day ACDs when the ACD system's controller detects that an agent has become available to handle a contact, the controller identifies all predefined contact-handling queues for the agent (usually in some order of priority) and delivers to the available agent the highest-priority oldest contact that matches the agent's highest-priority queue.

Originally, contact centers were designed as single site operations. In other words, all of the contact center resources such as servers, agents, managers, and the like were located at a single site. A single site contact center was relatively easy to manage because all of the resources were essentially in a common environment. When an agent became available, the server controlling workflow was apprised of the availability almost instantly and could monitor the contact and agent queues in real-time.

As businesses become global and contact center job outsourcing becomes a viable option to many companies, contact centers are beginning to grow into multiple site operations. The resources for a contact center may be redundantly provided at each site such that every site can operate autonomously and communication between sites is not a requirement for operation. However, providing fully redundant contact center sites can become costly when the only additional resource really required is contact center agents. For this reason, many multiple site contact centers share resources. For example, one site may have all of the resources to be a complete contact center, whereas another site only has contact center agents or other resources with specific skills. The complete contact center receives all incoming contacts and routes the contacts to the other site having only agents or specialized resources. Under this scenario, contact center agent status information has to be relayed from the remote site to the ACD at the complete contact center. In fact, it is often the case in multiple site call centers that large amounts of information about the agents, skills (services), queues, and other status information needs to be transmitted between sites. An example of such a geographically distributed call center is described in US Patent Application No. 20060067506 to Flockhart et al., the entire disclosure of which is hereby incorporated herein by reference.

Contact centers have also evolved to accommodate remotely located, telecommuting workers (e.g., remote contact center agents) that can be added to the contact center on a dynamic basis as demand requires.

SUMMARY

Mechanisms have been developed to facilitate the efficient transmission of status and control information between geographically disparate call centers using codec tunneling. U.S. patent application Ser. No. 11/619,504 to Davis et al., the entire contents of which are incorporated herein by reference, describes how to utilize Session Initiation Protocol (SIP) and a Real-time Transport Protocol (RTP) to communicate data between separate communication elements. This particular patent application proposed to use the capabilities of SIP to find and connect two endpoints and establish an RTP session between the endpoints.

It has also been proposed to utilize conference call facilities to allow interested parties (e.g., distributed locations or devices) to dial into or connect with a secure conference call and then publish and subscribe to data which is published by other participants of the conference call. These mechanisms were first described in U.S. patent application Ser. No. 12/239,120 to Steiner et al., the entire contents of which are incorporated herein by reference. The use of a conference call structure allowed various locations in a contact center to efficiently disseminate status information with other interested parties without broadcasting to the entire contact center (unless every element in the entire contact center was subscribing to a particular conference).

These solutions, while useful in developing a distributed contact center, have yet to fully exploit the potential of a distributed contact center and particularly the processing and memory capabilities of remote agent communication devices. Accordingly, embodiments of the present invention provide a contact center that is made up of a hierarchical collection of nodes. Thus, a modular or "grid-based" contact center is provided whereby each node in the grid has a processor, some form of non-removable memory, and is smaller, cheaper, and more reliable than a typical server. Each node can provide services such as Touch Tone decoder services, Automatic Speech Recognition services, Conferencing services, Auto Agent services, Work Assignment services, Report Aggregation services, in addition to, or in lieu of, supporting functions typically needed by a human contact center agent (e.g., call handling functions, graphical user interface functions, database access functions, etc.).

Grid-based computing is the application of several computers to a single problem at the same time—usually to a scientific or technical problem that requires a great number of computer processing cycles or access to large amounts of data. Grid-based computing has been used to crack certain types of encryption keys and protocols. The idea of grid-based computing has not, however, been used in the context of a contact center.

Each device operating in a contact center (e.g., routers, agent communication devices, peripheral devices, switches, servers, and the like) tend to utilize only about 20% to 30% of their total processing capabilities at a given time. Additionally, certain types of devices, such as agent communication devices, utilize their resources in spurts and then are almost completely idle, thereby leaving available up to 90% of their processing resources. Embodiments of the present invention propose harnessing some or all of these wasted and/or idle resource capabilities to perform real-time processing tasks in a contact center environment.

Thus, as one example, an agent's communication device can be adapted to support the processing needs of the human agent (e.g., support communications, provide access to various databases, etc.) while simultaneously supporting the processing needs of the contact center (e.g., support IVR tasks, support contact routing processing, support higher level task management, etc.). In other words, the resources of an agent communication device can simultaneously process agent-based tasks for a particular contact to which the agent is connected as well as process other contact center tasks). This reduces the amount of idle resources throughout the entire contact center, thereby creating a more efficient and cost-effective contact center due to the decreased need for dedicated resources.

In one example, a contact center may not necessarily need to purchase a central server for managing contact center operations as this task may be distributed among the various other nodes in the contact center. In a more particular example, a contact center could be provided without any dedicated IVR or call recording equipment as these tasks could be performed by other nodes in the contact center.

In accordance with at least some embodiments of the present invention, every node in a distributed contact center performs at least some task associated with the contact center. The tasks performed may include agent-based tasks and/or general contact center operational tasks.

In accordance with at least some embodiments of the present invention, a method of operating a contact center is provided that generally comprises:

As can be appreciated by one skilled in the art, a single communication endpoint or node may be adapted to publish and subscribe to published information regarding one or more tasks. The conference mechanism is a mechanism that facilitates the sharing of this published information among other subscribing entities (e.g., other communication endpoints and/or sites).

An RTP packet and header structure as well as the Real-time Transport Control Protocol (RTCP) is described more fully in US Patent Publication No. 20030120789 to Hepworth et al., the entire disclosure of which is hereby incorporated by reference. Although embodiments of the invention are described in connection with the use of RTP, it can be appreciated by one of skill in the art that a similar media transport protocol may be employed. Accordingly, as used herein "RTP" is understood to include any standardized or non-standardized packet format for delivering audio and/or video information over a packet switched network. Allowable protocols may include any multicast and/or unicast protocols used in streaming media systems. The protocols may be designed for real-time applications like RTP or they may be designed for non-real-time application. Moreover, RTP as discussed herein can include any past, present, or future version of RTP including Secure RTP (SRTP) and those versions and derivatives of RTP not yet contemplated.

As can be appreciated by one of skill in the art, a contact is understood herein to include voice calls, emails, chat, video calls, fax, Instant Messages (IMs), collaboration software, desktop sharing, conferences, and combinations thereof. Accordingly, a contact center may be equipped to handle any one or a number of the above-noted contact types.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system using a server(s) and/or database (s), the invention is not limited to use with any particular type of communication system or configuration of system elements. Those skilled in the art will recognize that the disclosed techniques may be used in any computing application in which it is desirable to distribute contact center processing tasks.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
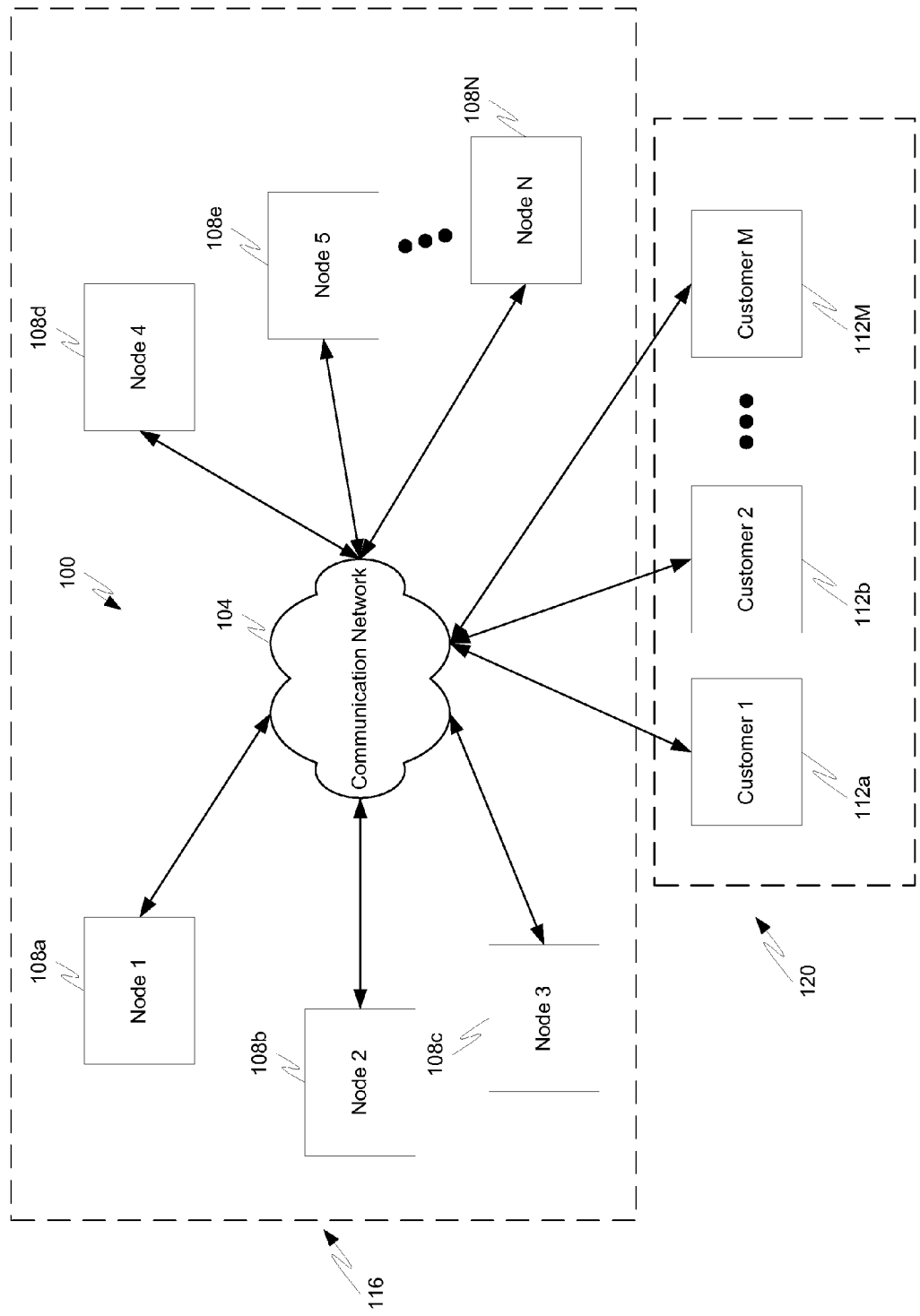
FIG. 1 is a block diagram depicting a distributed contact center in accordance with embodiments of the present invention.

FIG. 1 shows an illustrative embodiment of a distributed contact center 100 in accordance with at least some embodiments of the present invention. The contact center 100 comprises a contact center servicing side 116 that is in communication with a customer side 120. A plurality of nodes 108a-N are provided in the contact center to service contacts received from the customer side 120. More specifically, one or more user communication devices 112a-M are adapted to generate contacts that are received at the servicing side 116.

Once a contact is received at the servicing side of the contact center 100, the contact is processed by one or more nodes 108 on the servicing side 116. In accordance with at least some embodiments of the present invention, a single node 108 may be adapted to perform multiple tasks in connection with processing a single contact. For instance, a single node 108 may comprise an agent communication device that allows the agent to communicate with the customer or otherwise process a received contact. Such an agent communication device may also be adapted to perform IVR functions and/or make contact routing decisions for the contact that is ultimately assigned to the agent associated with the agent communication device (i.e., the agent interfacing with inputs/outputs of the communication device).

A communication network 104 is used to connect all of the nodes 108 in the servicing side 116 as well as connect the nodes 108*a*-N to user communication devices 112*a*-M. In accordance with at least some embodiments of the present invention, the communication network 104 may comprise any type of known communication medium or collection of communication mediums and may use any type of protocols to transport messages between endpoints. The communication network 104 may include wired and/or wireless communication technologies. The Internet is an example of the communication network 104 that constitutes and IP network consisting of many computers and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication mediums such as coaxial cable, copper cable/wire, fiber-optic cable, antennas for transmitting/receiving wireless messages, and combinations thereof.

Figure 2:
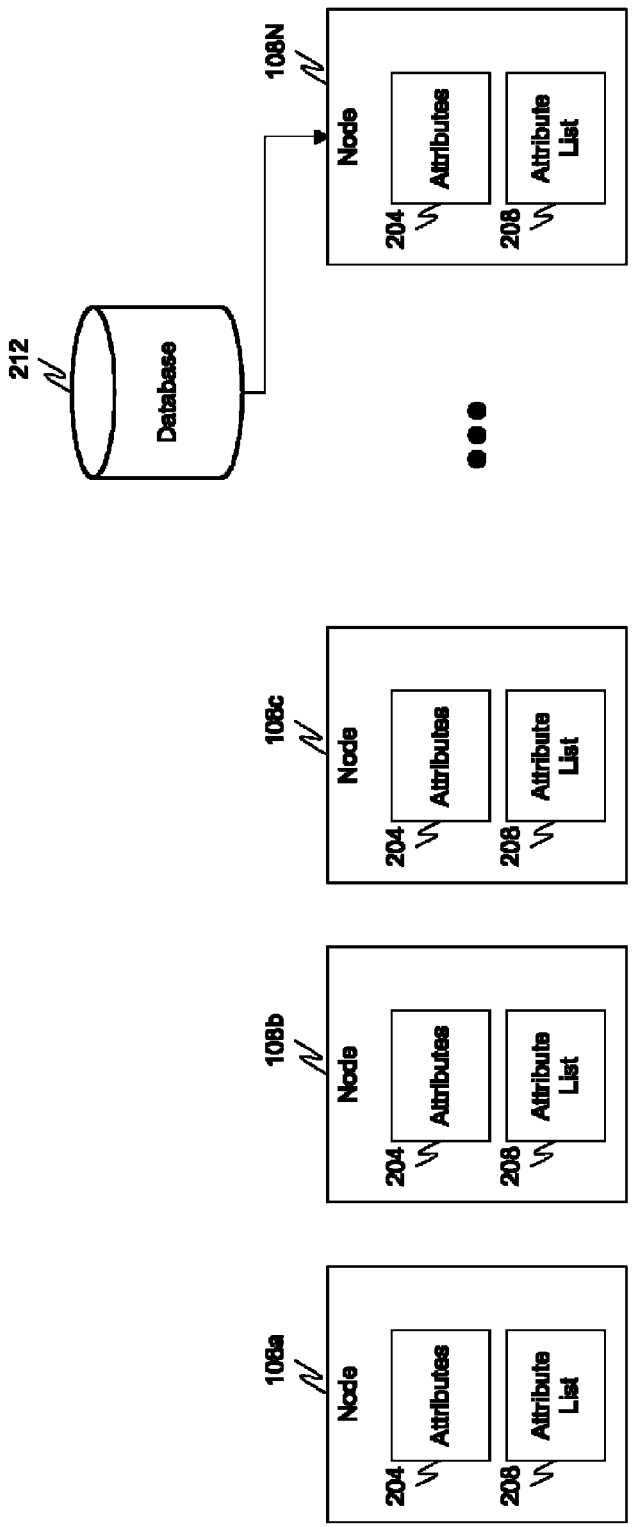
FIG. 2 is a block diagram depicting nodes in a distributed contact center in accordance with embodiments of the present invention.

Referring now to FIG. 2, an exemplary set of nodes 108*a*-N. Each of the contact center nodes 108 may correspond to any type of processing resource capable of communicating via the communication network 104 (i.e., each node 108 comprises a network interface). In accordance with at least some embodiments of the present invention, each node 108 comprises some sort of processing resource and memory resource. More specifically, some of the nodes 108 can be relatively simple nodes 108 and comprise a non-motion based memory (i.e., no disk drive), and is smaller, cheaper, and more reliable than a typical server. Alternatively, some of the nodes 108 may comprise supercomputers (with large processors and memory resources) that are capable of processing a great number of tasks at a relatively high rate. In still another alternative, some of the nodes 108 may comprise a General Processing Unit (GPU).

Each node 108 is capable of providing one, two, three, or more contact center services including, without limitation, Touch Tone decoder services, Automatic Speech Recognition services, Conferencing services, Auto Agent services, Work Assignment services, Report Aggregation services, Monitoring service, Audit services, Recording services, Command and Control services, Speech Analysis services, combinations thereof, and any other services used in a contact center.

The processing resources, memory capabilities, and other functions available to a particular node are included in a node's 108 set of attributes 204. The attributes 204 available to a node 108 may be listed in an attribute list 208 also maintained on the node 108. The attributes 204 of a given node 108 may also include external resources that are available to and/or maintained by a particular node 108. As an example, if a node 108 has access to one or more databases 212, then that information may also be included as an attribute 204. Both the internal and external attributes 204 of a node 108 may be listed in the attribute list 208. The attribute list 208 may include a listing of the attributes 204 available to a given node 108 as well as the amount of processing supported by the node 108 in usual operations. Attributes 204 describe things (i.e., resources available such as a GPU to do quick processing, or a large memory, etc.) and their capabilities and the attribute list 208 describes availability details or willingness of a node 108 to contribute its attributes 204 to one or more contact center tasks.

As an example, a node 108 may comprise an agent communication device and has a normal utilization amount of between 20% and 30%. The attribute list 208, therefore, provides a weighted value for each attribute 204 available to the node 108. In one example, the weighted value for an attribute score in the attribute list 208 is based on the amount of average utilization of the node 108 and/or the type of usage activity (e.g., whether loads processed at the node 108 are continuous and relatively uniform or whether loads processed at the node 108 are non-continuous and/or non-uniform). Many other types of parameters may be considered when generating the attribute list 208, such as node 108 location relative to the origin of a contact, node 108 location relative to other nodes 108, the reliability of a node 108, and the like. These parameters may be inputs to any type of known scoring mechanism used to weight the values of an attribute 204 in the attribute list 208. Further examples of such algorithms will also become apparent to those skilled in the art. In accordance with at least some embodiments of the present invention, the score for a given attribute in the attribute list 208 is based on the attributes 204 of a node 108 and the way in which the node 108 is used.

Figure 3:
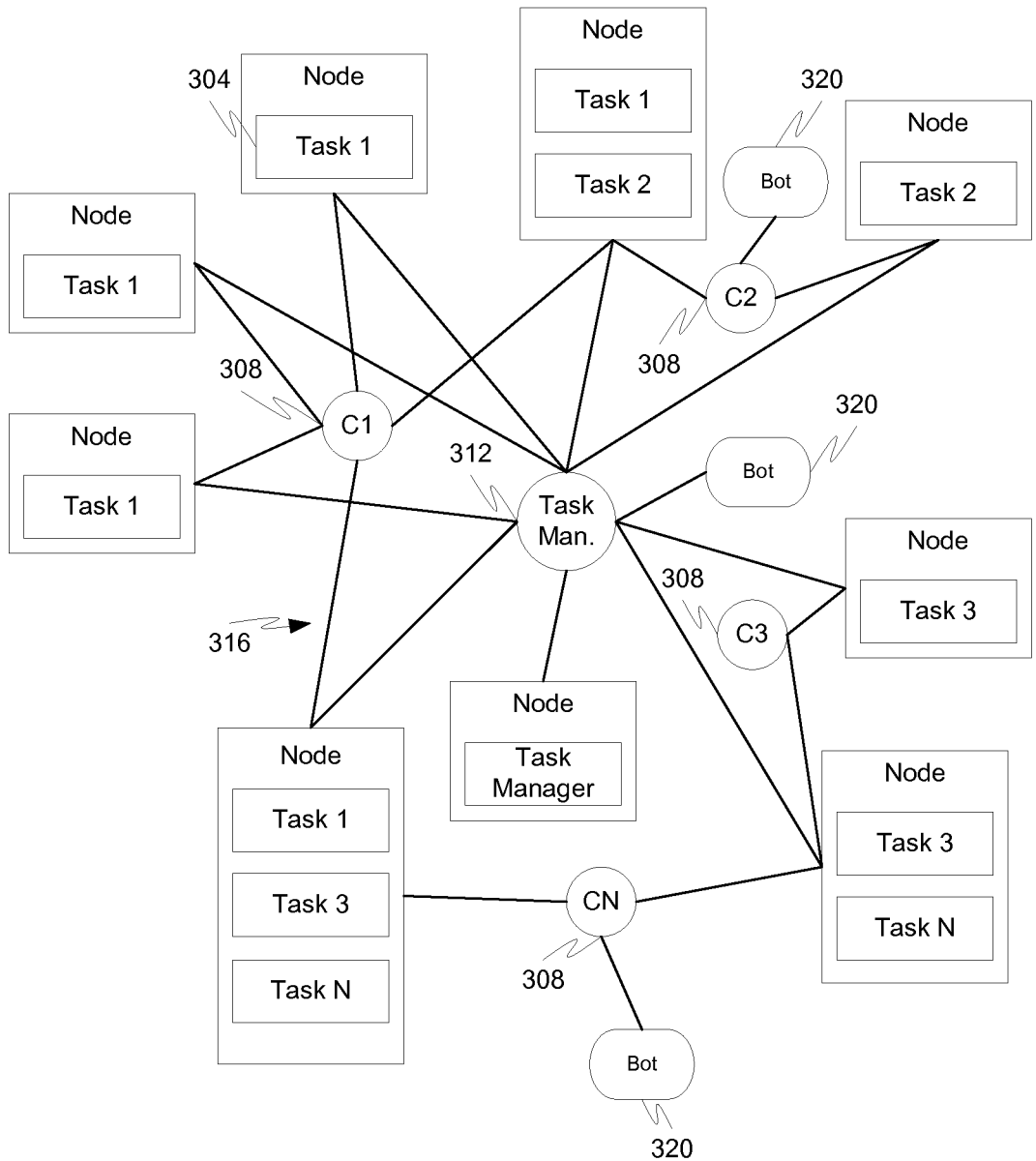
FIG. 3 is a block diagram depicting the interaction of nodes in a distributed contact center in accordance with embodiments of the present invention.

With reference now to FIG. 3, the interconnection of nodes 108 in a grid-based contact center 100 is depicted in accordance with at least some embodiments of the present invention. As can be seen in FIG. 3, the nodes 108 may be in communication with one another through a network of conference 308. The conferences established between nodes 108 are the types of conferences described in further detail in U.S. patent application Ser. No. 12/239,120, the entire contents of which are hereby incorporated herein by reference. Each conference 308 may be associated with a different contact center task or collection of tasks 304. The number of conferences 308 utilized in connection with a particular contact center may vary depending upon the granularity with which tasks have been divided among nodes 108.

In accordance with at least some embodiments of the present invention, a plurality of nodes 108 used to perform a similar task or set of tasks 304 may subscribe to a common conference 308. When a node completes a particular task (e.g., routes a contact, services a contact with an IVR function, performs a speech-to-text conversion, etc.) the results of that task along with any other state information may also be published back to the same conference 308. This allows all nodes 108 performing a similar task 304 to know the status of the other nodes 108 via the conference 308.

Furthermore, as contacts enter the contact center 100, a number of different work items for different tasks may be generated. For example, when a real-time call is received as a contact, work items for an IVR task as well as a database lookup task may be generated. These particular work items may be bid on by all nodes 108 connected to the conference 308 associated with that task. Thus, the work item is given to the node 108 with the best bid. In accordance with at least some embodiments of the present invention, each node 108 bids on work items for a particular task by publishing their attribute list 208 or a subset thereof to the associated conference 308. The other nodes 108 may also publish their attribute list 208, thereby facilitating an open negotiation for each work item associated with a particular task. As can be appreciated by one skilled in the art, as a more qualified node 108 wins work items for a particular task, the processing resources of that node 108 will vary, thereby decreasing the amount of attributes 204 available to the node 108 at a particular time. This decrease will result in a decreased attribute score in the attribute list 208 and this will effect the node's 108 ability to win subsequent work items until previously assigned work items have been completed.

In at least some embodiments, rather than relying upon an completely open negotiation structure, one or more nodes 108 may be assigned the task of assigning work items for a particular task. Thus, each conference 308 may have a plurality of nodes 108 connected thereto that are bidding on work items for the task associated with the conference 308. The conference 308 may also have one or more nodes 108 connected thereto whose job is to process the bids received at the conference 308 from the other nodes 108 and assign work items based on the bids received for a particular work item.

In addition to having conferences 308 associated with particular contact center tasks, embodiments of the present invention also contemplate the existence of a task management conference 312. The task management conference 312 is the conference used by all nodes 108 to receive their task assignments and to maintain the overall Operations, Administration, and Management (OA&M) of the grid-based contact center 100. In accordance with at least some embodiments of the present invention, when a new node 108 is added to the contact center 100, that node 108 first subscribes to the task management conference 312 where a node 108 managing the task assignment duties assigns the newly added node 108 to a particular conference 308 associated with a particular task. The newly added node 108 is preferably added to a task based on its capabilities and the needs of the contact center. By assigning the newly added node 108 to a task 304, the node 108 responsible for managing the overall operation of the contact center is adapted to evenly distribute the work load among all nodes 108 based on the dynamic task needs of the contact center, node 108 capabilities or resources (where attributes 204 define a node's 108 resources (which can include hardware and/or software resources) and the attribute list 208 describes the node's willingness to share such attributes 204), and any business rules associated with the OA&M of the contact center 100.

A node 108 is assigned a particular task and given the conference identification information to begin receiving work items for that task. More specifically, the node 108 is provided with information that allows the node 108 to identify the appropriate conference 308 and create a secured subscribe/publish connection 316 with the conference.

As can be seen in FIG. 3, a node 108 may be adapted to perform more than one task at a time and can, therefore, subscribe and publish to multiple conferences 308 at the same time. Additionally, a node 108 that is responsible for assigning other nodes 108 to tasks may also be adapted to perform other non-managerial tasks if that node 108 has the available attribute 204 bandwidth.

In addition to supporting the connection of nodes 108 to a conference 308, embodiments of the present invention also contemplate utilization of bots 320 to monitor and report status information for a particular conference 308. More specifically, the node 108 responsible for the overall management of the contact center may not have the processing capabilities to efficiently monitor the status of all conferences in the contact center. Accordingly, one or more bots 320 may be distributed throughout the contact center to monitor the status of one or more conferences 308, determine if the status of a conference 308 is in an acceptable state (i.e., work items are being processing on time or ahead of time) or if the conference 308 is in an unacceptable state (i.e., work items are being processed late). The bots 320 may also be adapted to report such conference state information back to the managing node 108 to help in the subsequent assignment of newly added nodes 108 to tasks and/or the reassignment of nodes 108 to different tasks.

Bots 320 may be distributed throughout the entire contact center 100 is a number of different ways. As one example, a large number of bots 320 may be sent to a particular location where a problem has been identified. In other words, if a task is found to be falling behind, then multiple bots 320 may be assigned to a conference(s) 308 associated with that task in an attempt to obtain more diagnostic information regarding the problem. As another example, an undirected swarming of bots 320 can be used. In this example, if voice QoS is found to be deficient at a particular conference 308, then bots 320 may be swarmed to monitor all of the nodes 108 connected to that conference 308 rather than monitor the conference itself. This can allow the bots 320 to try and identify the source of the QoS problem and report that information back to the managing node 108. As yet another example, customer usage of a conference 308 may be monitored to see if the conference is migrating (i.e., task needs are moving around the world as the time changes across the world). Thus, the bots 320 may be swarmed to a particular geographic locality to determine if more nodes 108 are needed for a particular task in a particular geographic location as it may be better to assign local nodes 108 to a task that is receiving a high demand in a particular location to reduce the amount of distance between a node 108 and its conference 308 (i.e., to reduce latency).

As can be appreciated by one skilled in the art, in addition to, or as an alternative to using bots 320, the attribute list 208 of each node 108 may also be published to the task management conference 312 on a periodic basis to allow the managing node 108 to determine whether nodes 108 need to be reassigned to different tasks, etc. Thus, in accordance with at least some embodiments of the present invention, each node 108 in the contact center may continue to publish state information to the management conference 312 even after they have been reassigned to a task-based conference 308.

The functions of a bot 320 are not necessarily limited to monitoring and reporting functions, although the bots 320 are particularly well suited for performing such functions. The bots 320 may also be adapted to perform other functions such as manage a conference 308 (i.e., a task) based on a rule set supplied by a managing node. Thus, when a node 108 is assigned to a particular task and initially subscribes to the associated conference 308, a bot 320 managing that conference 308 may be adapted to communicate with the newly joining node 108 to determine whether the node requires additional software to perform the task to which it has been assigned. This communication may either be in the form of a query response communication (i.e., where the bot 320 queries the newly joining node 108 regarding its software capabilities) or may be a publication observation where the newly joining node 108 publishes its attribute list 208 to the conference such that the bot 320 can view the node's 108 resources and capabilities and determine if the node 108 requires additional software. If the bot 320 determines that the newly joining node 108 requires additional software, then the bot 320 may also be adapted to cause the node 108 to download such software prior to accepting any tasks sent to the conference 308.

As noted above, the bots 320 may also manage the distribution of work flow within a particular conference. As one example, when a work item (for a contact or in the form of a contact) enters a conference for processing, the bot 320 may identify the node 108 to which the work item should be assigned and causes the assigned node 108 to accept the task. Alternatively, the bot 320 may initiate a bidding process in which all of the other nodes 108 connected to the conference 308 submit their current attribute lists 208 to the bot 320, thereby enabling the bot 320 to make a work item assignment choice. In still other embodiments, the nodes 108 may assign work items among themselves, but the bot 320 may be responsible for determining if any particular node 108 is not going to finish a work item on time and, in response to making such a determination, may reassign the work item to another node 108 also connected to the same conference 308.

Figure 4:
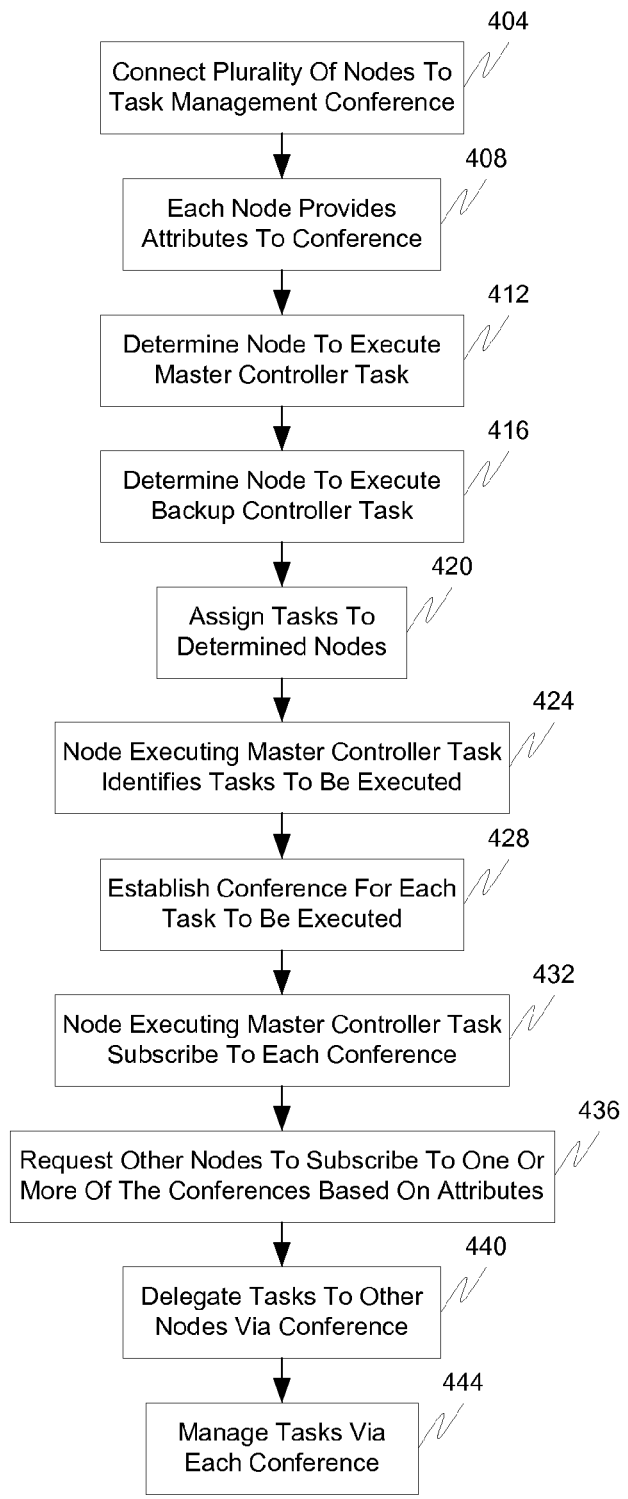
FIG. 4 is a flow chart depicting an exemplary contact center management method in accordance with embodiments of the present invention.

With reference now to FIG. 4, an exemplary method of administering a grid-based contact center will be described in accordance with at last some embodiments of the present invention. The method is initiated when a plurality of nodes (two or more) are added to a grid-based contact center 100 (step 404). Each of the nodes 108 connect to the management conference 312 to negotiate on becoming the manager of the contact center 100 and/or receive task assignments from the managing node 108. Once connected to the management conference, the nodes 108 publish their attribute lists 208 or relevant portions thereof to the conference 312 (step 408). This allows the nodes 108 to negotiate who should perform the management functions for the contact center and further report their attributes to the managing node 108.

In accordance with at least some embodiments of the present invention other types of selection algorithms may be performed to identify a managing node. Any kind of scoring or decision making details may be included in a bidding process. Alternatively, or in addition, the other types of scoring or decision making algorithms may be used such as first come, first assigned, and reassignment of the task to any subsequently joining node 108 with greater qualifications. As another possible alternative, the nodes 108 may be assigned to the management task based on administrative selection or weighting. Other types of selection algorithms will become apparent to those skilled in the art.

Based on the relative attributes of each node 108, a node 108 is selected to manage the overall operations of the contact center (step 412). As can be appreciated by one skilled in the art, one or more nodes 108 may be selected to act as a managing node, depending upon the size of the contact center. Additionally, one or more backup nodes 108 may also be identified in this case for redundancy in case the primary managing node(s) becomes incapable of managing the contact center or in case the size of the contact center requires multiple nodes 108 to manage the operations thereof (step 416). The node(s) that have taken on management responsibilities then assign themselves to the task of managing the conference (step 420).

This causes the management node to begin managing the operations of the contact center. First, the management node 108 identifies the types of tasks that are needed (i.e., by identifying current contact center needs based on contacts received in the contact center) or will be performed in the contact center (i.e., by referencing pre-defined parameters identifying the number of tasks that are expected and the amount of processing resources required to perform such tasks) (step 424).

For each task identified in step 424, the management node establishes a conference 308 and associates each conference with a particular task (step 428). The management node maintains this association information in memory and will provide the conference identification information to nodes 108 which are assigned to a particular task. Furthermore, the management node may subscribe to each of the newly created conferences so as to receive updated state information from all nodes connected to that conference 308 (step 432). Alternatively, or in addition, the management node may be assigned to a bot 320 or collection of bots 320 acting as a remote agent for the management node.

In addition to subscribing to each of the conferences 308, the management node also identified newly added nodes when such nodes first subscribe or connect with the management conference 312. Upon detecting a newly added node 108 or upon detecting the need to reassign nodes 108 to different tasks, the management node requests attribute information from the nodes 108 in the form of their attribute lists 208. Based on the attributes of the other nodes in the contact center, the management node identifies tasks to be executed by the other nodes in the contact center and assigns such nodes to those tasks. In performing this step, the management node sends a request to the other node requesting that the other node subscribe to a particular conference and begin performing tasks associated with that conference (step 436). Also, once a decision is made, software may be sent in bots 320 to a node that can download software to the node if such software is needed. Bot 320 can stick with the node or conference to provide other nodes connecting to the conference. Nodes 108 can also be recruited for a conference 308 if they have the minimum software requirements provided by a bot 320.

The management node can then also delegate new tasks to other nodes via the management conference 312 and/or other conferences to which a node is connected (step 440). Furthermore, by monitoring the status of each conference 308, either directly or via a bot 320, the management node is adapted to continue managing the contact center to ensure that all received contacts are properly handled and processed (step 444).

As one non-limiting example, a contact may be received at an operational contact center (i.e., a contact center where the management node has already been determined and other nodes have been assigned to particular tasks), where it is initially transferred as a work item to a Work Assignment conference 308. All of the nodes 108 connected to the Work Assignment conference 308 are then allowed to bid on the new work item by publishing their attribute list 208 to the conference. As can be appreciated, however, the publishing step may have already occurred prior to receipt of the new work item.

Thereafter, the work item of assigning the contact to a particular contact center queue (e.g., a queue associated with an IVR or a queue associated with a human agent or group of human agents) is given to a particular node which processes the work item and assigns the contact to a particular queue in the contact center.

Now assume that the contact was transferred to an IVR task to receive basic information from the contact initiator. The conference associated with an IVR task is then identified and the contact is transferred to the identified conference as a new work item. The node that performed the work assignment task may be responsible for directly transferring the contact to the conference associated with the IVR task. Once the contact is connected with the IVR conference, the nodes connected thereto bid or which are selected by some other predefined process or processes on the work item and the work item is transferred to one of the nodes for IVR processing. In accordance with at least some embodiments of the present invention, the bot 320 may also have the ability to talk to a conference 308 as well as initiate transfers of work items.

After the node has completed the IVR task of the contact, the contact may then be assigned to a queue where it waits for assignment to a human agent. While the contact is waiting for assignment to the next available human agent, a recorded message may be played to the initiator of the contact. The task associated with playing a recorded message back to the initiator may be considered another task of the contact center in which case the contact is transferred to recording player conference for assignment to a particular node. These tasks may be processed while the contact waits for assignment. Furthermore, the transferring of the contact to a number of different conferences may be seamless and transparent to the initiator of the contact.

Figure 5:
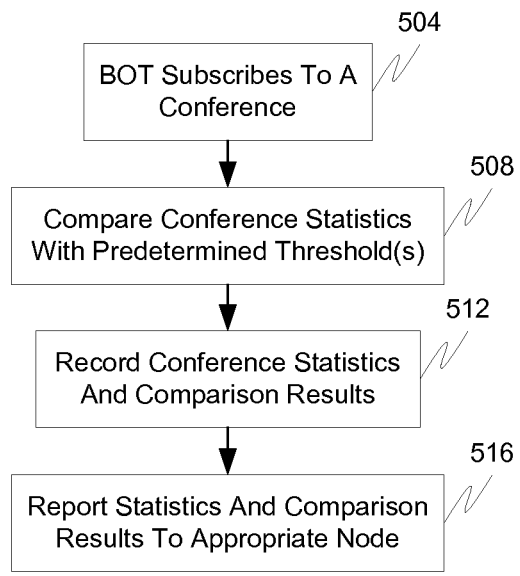
FIG. 5 is a flow chart depicting an exemplary task assessment method in accordance with embodiments of the present invention.

With reference now to FIG. 5, an exemplary method of monitoring a conference with a bot 320 will be described in accordance with at least some embodiments of the present invention. The method is initiated when a bot 320 subscribes to a conference (step 504). Assignment of a bot 320 to a conference causes the bot 320 to begin receiving state information for the conference and comparing such information with predetermined thresholds (step 508). More particularly, the bot 320 is adapted to subscribe to the state information published to the conference by all other conference participants. Thus, when a conference participant publishes state information indicating that work items are being processed too slowly, the bot 320 is made aware of this information. The thresholds used as a comparison are generally based on risk states associated with a particular task. The type of threshold may depend upon the type of task being performed at a particular conference. Thus, some bots 320 may utilize QoS thresholds for tasks that require a certain level of voice quality while other bots 320 may utilize contact wait time, hold time, and the like for tasks that are time sensitive (e.g., real-time contacts).

The bot 320 is then adapted to record the conference statistics as well as the comparison results (step 512). Furthermore, the bot 320 is adapted to report such information to the appropriate node (i.e., the management node) (step 516). This information may either be reported directly to the management node or may be reported to the management node via the management conference 312.

Figure 6:
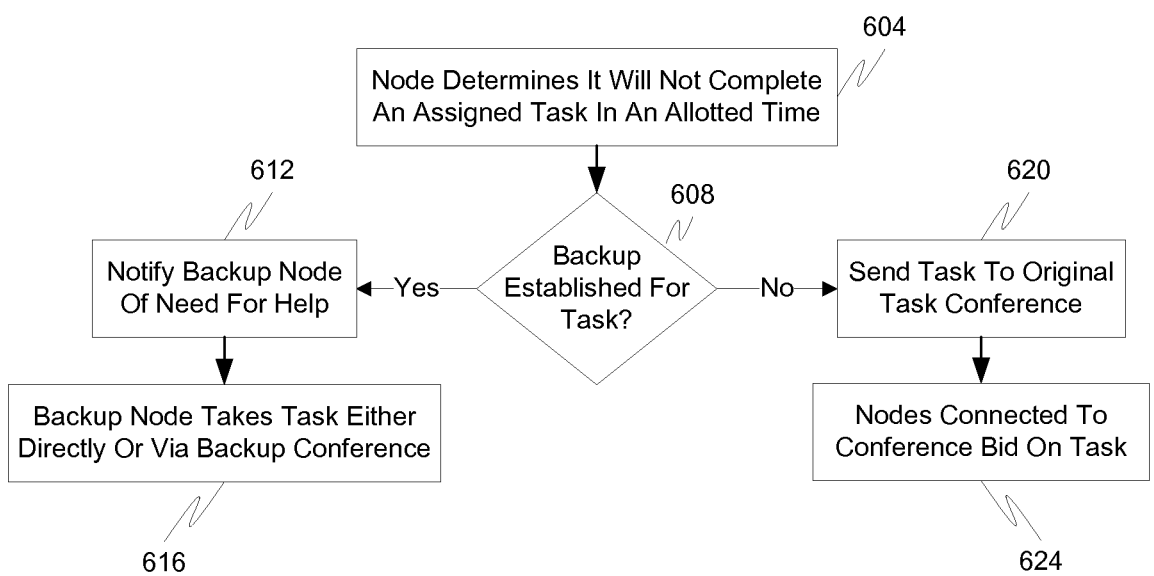
FIG. 6 is a flow chart depicting an exemplary task re-distribution method in accordance with embodiments of the present invention.

With reference now to FIG. 6, an exemplary method of re-assigning work items for a particular task will be described in accordance with at least some embodiments of the present invention. The method is initiated when a node 108 determines that it will not be able to complete a work item or task assigned thereto within an allotted time (step 608). This may be a self determination or may be a determination made by a node which is monitoring the progress of nodes connected to a particular conference and performing certain tasks. Once the node becomes aware that it won't be able to process the task within the allotted time, the node determines whether it would be more time/cost efficient to perform the task itself and have it be late or whether there is enough time to have the task reassigned to another node for processing.

If the node determines that reassignment to another node is the best course of action, the method continues with the node determining whether there is already a pre-designated backup node ready to take the task (step 608). In the event that a pre-determined backup node exists and is identifiable by the node currently in control of the task, the method continues by notifying the backup node of the need for help (step 612) and then transferring the task to the backup node for processing (step 616). As can be appreciated by one skilled in the art, the task may be transferred to the backup node either directly or via an established backup conference.

Referring back to step 608, if there is no predetermined backup node, then the task is transferred from the node which has determined that it cannot timely process the task back to the original conference associated with the task to be performed (step 620). The transfer of the task back to the conference causes a new work item bid process (or any other selection mechanism) to begin between the other nodes connected to the conference (step 624). The transferred task may have a higher priority than other tasks assigned to the same conference in which case it may be assigned to a node before other tasks with a lower priority. Furthermore, nodes 108 with attributes specific to handling emergency tasks (e.g., a node that historically handles sporadic processing demands and has just completed such a processing demand, thereby making it more likely that it will have a greater amount of resources available to process an emergency task).

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA®, or a domain specific language, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for administering a grid-based contact center. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A communication method, comprising:
  receiving a contact in a contact center;
  identifying a task to be performed in connection with servicing the contact;
  transferring by the processor in a contact center server to a mixer hosting a telephony conference the contact to a conference associated with the identified task;
  assigning the contact to a first node from a plurality of nodes subscribing to the conference associated with the identified task; and
  assigning a bot to the conference to perform one or more of the following functions: (i) monitor real-time conference activity between the conference participants; (ii) determine a real-time state of the conference; (iii) upload software on nodes connected to the conference; (iv) route work items received at the conference; (v) reassign work items; and (vi) report conference activity to a managing node.

2. The method of claim 1, wherein each of the plurality of nodes have established an RTP stream with the conference, wherein the RTP stream is used by the plurality of nodes to bid on contacts transferred to the conference, wherein the first node was selected for the contact, and wherein assigning the contact to the first node comprises establishing a connection directly between the contact and the node.

3. The method of claim 2, wherein each of the plurality of nodes provides an attribute list to the conference via the RTP stream in connection with bidding on contacts.

4. The method of claim 1, wherein the plurality of nodes are assigned to the conference by a management node, wherein the management node negotiates between at least one other node in the contact center to perform the task of managing nodes in the contact center, and wherein the management node provides each of the plurality of nodes with conference identification information allowing each of the plurality of nodes to locate and connect with the conference.

5. The method of claim 1, wherein the task comprises one or more of Touch Tone decoder services, Automatic Speech Recognition services, Conferencing services, Auto Agent services, Work Assignment services, Report Aggregation services, Monitoring service, Audit services, Recording services, Command and Control services, and Speech Analysis services.

6. The method of claim 5, wherein the first node performs services to support a human contact center agent in addition to performing one or more of Touch Tone decoder services, Automatic Speech Recognition services, Conferencing services, Auto Agent services, Work Assignment services, and Report Aggregation services.

7. A non-transitory computer readable storage medium comprising processor executable instructions stored thereon that, when executed, perform the steps of claim 1.

8. A communication device, comprising:
  a user interface adapted to provide information to a contact center agent and receive inputs from the contact center agent;
  a network interface; and
  a set of attributes including a processing resource and a memory resource, wherein the set of attributes are used to support activity of the contact center agent while simultaneously performing a contact center task not associated with supporting activity of the contact center agent; and
  at least one bot, that is assigned to at least some of the plurality of conference mechanisms, to perform one or more of the following functions: (i) monitor real-time conference activity between the conference participants; (ii) determine a real-time state of the conference; (iii) upload software on nodes connected to the conference; (iv) route work items received at the conference; (v) reassign work items; and (vi) report conference activity to a managing node.

9. The communication device of claim 8, wherein the contact center task comprises one or more of Touch Tone decoder services, Automatic Speech Recognition services, Conferencing services, Auto Agent services, Work Assignment services, Report Aggregation services, Monitoring service, Audit services, Recording services, Command and Control services, and Speech Analysis services.

10. The communication device of claim 8, wherein the memory resource comprises non-motion based memory.

11. The communication device of claim 8, wherein the contact center task comprises managing the assignment of nodes to other contact center tasks.

12. The communication device of claim 8, wherein an RTP stream is established between the communication device and a conference via the network interface, and wherein information related to the set of attributes is provided to the conference via the RTP stream.

13. The communication device of claim 12, wherein the information related to the set of attributes includes an identification of attributes in the set of attributes and one or more of an amount of processing historically performed in connection with supporting activity of the contact center agent, an amount of processing historically performed by the set of attributes, and an amount of resources currently being utilized.

14. The communication device of claim 8, wherein the user interface comprises a user output adapted to display information related to a contact to the contact center agent and a user input including one or more of a keyboard, mouse, roller ball, touch-pad, touch-screen, and stylus.

15. A contact center, comprising:
  a plurality of nodes interconnected with one another via a plurality of conference mechanisms, the conference mechanisms being associated with different contact center tasks, wherein a first of the plurality of nodes negotiates to manage agent-based tasks and at least one contact center task; and
  at least one bot, that is assigned to at least some of the plurality of conference mechanisms, to perform one or more of the following functions: (i) monitor real-time conference activity between the conference participants;

(ii) determine a real-time state of the conference; (iii) upload software on nodes connected to the conference; (iv) route work items received at the conference; (v) reassign work items; and (vi) report conference activity to a managing node.

16. The contact center of claim 15, wherein the first node is connected to a first conference mechanism, wherein the first conference mechanism is used by other nodes to receive task assignments, wherein tasks assigned via the first conference mechanism have a same task type as the at least one contact center task.

17. The contact center of claim 16, wherein the task type of the at least one contact center task comprises at least one of Touch Tone decoder services, Automatic Speech Recognition services, Conferencing services, Auto Agent services, Work Assignment services, Report Aggregation services, Monitoring service, Audit services, Recording services, Command and Control services, and Speech Analysis services.

18. The contact center of claim 15, further comprising:
a management node adapted to assign nodes to conference mechanisms to perform different contact center tasks, wherein the management node comprises a processor resource and a memory resource, and wherein the memory resource comprises non-motion based memory.

19. The contact center of claim 18, wherein nodes are assigned to conference mechanisms based on attribute lists provided to the management node, wherein the attribute list of a node comprises information related to attributes of the node as well as usage history of the node.

20. The contact center of claim 15, wherein the plurality of nodes are connected to the conference mechanisms via RTP streams.

* * * * *